US006515716B1

(12) United States Patent
Suzuki et al.

(10) Patent No.: US 6,515,716 B1
(45) Date of Patent: Feb. 4, 2003

(54) TERMINAL DEVICE, ACCOUNTING SYSTEM AND DATA PROCESSING METHOD

(75) Inventors: Satoru Suzuki, Kanagawa (JP); Tetsuya Nomura, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/570,811

(22) Filed: May 15, 2000

(30) Foreign Application Priority Data

May 17, 1999 (JP) .......................................... 11-135967

(51) Int. Cl.[7] .................................................. H04N 5/63

(52) U.S. Cl. ....................................... 348/730; 345/212

(58) Field of Search ................................ 348/730, 553; 345/211–213; 713/320, 324, 330, 340

(56) References Cited

U.S. PATENT DOCUMENTS 5,616,988 A * 4/1997 Kim ............................. 315/1
5,808,693 A * 9/1998 Yamashita et al. .......... 348/554
5,870,086 A 2/1999 Bang .......................... 345/212
5,944,830 A * 8/1999 Hong et al.

FOREIGN PATENT DOCUMENTS

EP 0840273 10/1997 ............ G09G/1/16

* cited by examiner

*Primary Examiner*—Victor R. Kostak
(74) *Attorney, Agent, or Firm*—Jay H. Maioli

(57) ABSTRACT

An image display device capable of reducing power consumption with improved effectiveness even when a sync signal sensor fails to sense both horizontal and vertical sync signals, wherein when a first sync signal sensor fails to sense both horizontal and vertical sync signals, a main power source, a heater power source device, and a first sync signal sensor power source device are turned off. Power is thus saved. When a second sync signal sensor senses at least one of the horizontal and vertical sync signals, the first sync signal sensor power source device that was turned off is turned on.

3 Claims, 6 Drawing Sheets

*FIG. 2A*

| Presence or Absence of Sync Signal | Cathode-Ray Tube | Description |
|---|---|---|
| Horizontal Sync Signal H Sensed<br>Vertical Sync Signal V Sensed | On | Normal Image Display Mode |
| Horizontal Sync Signal H Not Sensed | Standby | Image not Displayed (Main Power Source is Turned On and Heater Power Source is Turned On) |
| Vertical Sync Signal V Not Sensed | Suspended | Main Power Source Turned Off (Heater Power Source is Turned On) |
| Horizontal Sync Signal H not Sensed<br>Vertical Sync Signal V not Sensed | Off | Main Power Source Turned Off, Heater Power Source Turned Off, CPU Source Turned Off |

*FIG. 2B*

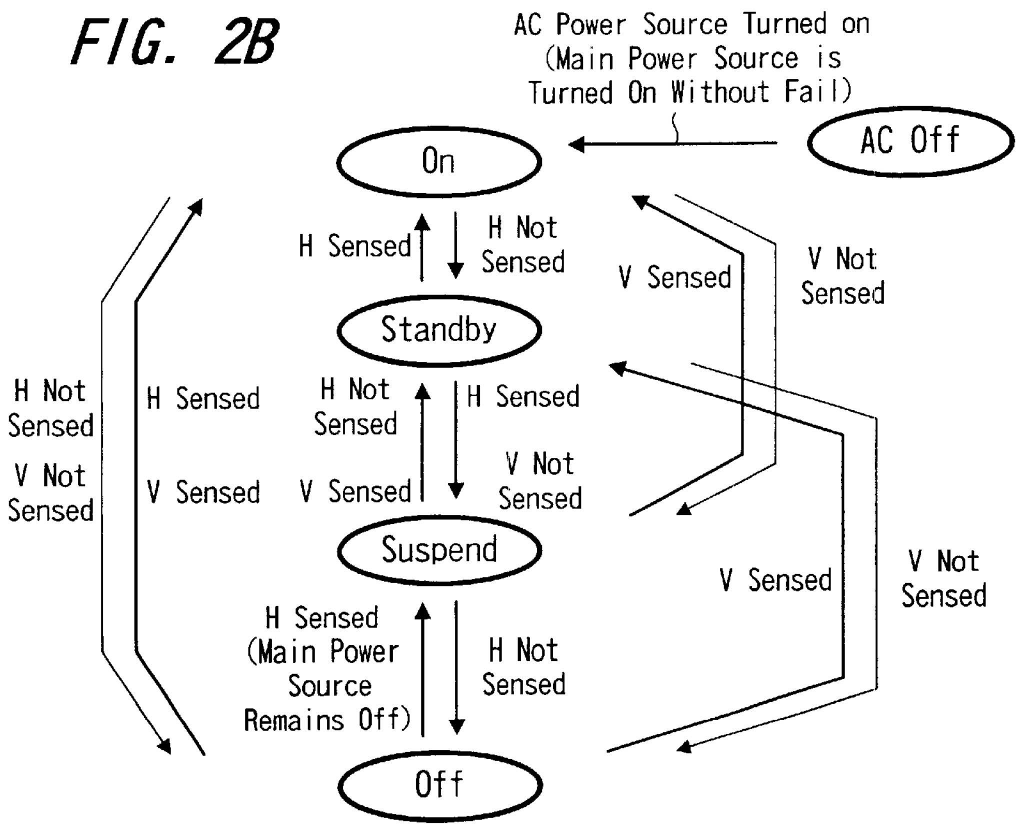

| |
|---|
| Information<br><br>Monitor is Working<br>BNC<br>No Input Signal |
| White |
| Red |
| Green |
| Blue |

TERMINAL DEVICE, ACCOUNTING SYSTEM AND DATA PROCESSING METHOD

BACKGROUND OF THE INVENTION

1. Field of the Invention

The present invention relates to an image display device capable of saving power.

2. Description of the Related Art

As for image display devices (monitors) (display devices) to be used while connected to computer systems, image display devices capable of automatically saving power to reduce power consumption have been put on the market. For example, in the U.S.A, the Video Electronics Standards Association has stipulated the standards on power saving for saving power to be consumed by display devices for computer systems. The standards specify an on mode, a standby mode, a suspension mode, and an active-off mode. The on mode is a mode in which an image is displayed. The standby mode, suspension mode, and active-off mode are modes in which no image is displayed, ranging in sequential order from what is least effective at power saving to what is most effective at power saving. The power saving modes are switched according to if horizontal and vertical sync signals have been sent from a computer system.

On mode: when both horizontal and vertical sync signals are transmitted, an image is displayed on the surface of a cathode-ray tube.

Standby mode: when the vertical sync signal is transmitted but the horizontal sync signal is not transmitted, power is saved to the least extent.

Suspension mode: when the horizontal sync signal is transmitted but the vertical sync signal is not transmitted, power is saved to the moderate extent.

Active-off mode: when both the horizontal and vertical sync signals are not transmitted, power is saved to the greatest extent.

Referring to FIG. 7, an image display device capable of saving power in accordance with a related art will be described below. TR, TG, TB, TH, and TV denote input terminals through which a red signal R, a green signal G, a blue signal B, a horizontal sync signal H, and a vertical sync signal V are sent from a computer system serving as a video signal source.

The red, green, and blue signals R, G, and B received through the input terminals TR, TG, and TB and the horizontal and vertical sync signals H and V received through the input terminals TH and TV are transferred to a video circuit 1. The video circuit 1 processes the red, green, and blue signals R, G, and B. The red, green, and blue signals R, G, and B sent from the video circuit 1 are transferred to a cathode-ray tube drive circuit 2, and then amplified. Thereafter, the signals are transferred to cathodes of an electron gun associated with each of the color signals in the cathode-ray tube 3. The video circuit 1 and drive circuit 2 are generically called a signal processing circuit.

A digital amplification factor control signal sent from a CPU 5 that will be described later is transferred to a D/A converter 6 and converted into an analog amplification factor control signal. The analog amplification factor control signal is transferred to the drive circuit 2, whereby an amplification factor is controlled.

The central processing unit (CPU) 5 serving as a sync signal sensor senses if horizontal and vertical sync signals H and V have been received through the input terminals TH and TV. Moreover, the CPU 5 produces horizontal data and vertical data, transfers the data to a horizontal drive signal generation circuit 8 and a vertical sawtooth signal generation circuit 7 respectively. The horizontal drive circuit 8 and vertical sawtooth signal generation circuit 7 generate a horizontal driving signal (horizontal pulsating signal) and a vertical sawtooth signal respectively. The horizontal driving signal (horizontal pulsating signal) and vertical sawtooth signal are transferred to a horizontal/vertical deflection circuit 9. Horizontal and vertical deflection signals sent from the horizontal/vertical deflection circuit 9 are transferred to a horizontal/vertical deflection yoke 4 of the cathode-ray tube 3. The horizontal driving signal generated by the horizontal driving signal generation circuit 8 is transferred to a high-voltage circuit (high-voltage generation circuit) 10. A resultant high voltage is applied to an anode of the cathode-ray tube 3.

Reference numeral 15 denotes a power source device composed of a chopper switching regulator 16 and a transformer 17. The chopper switching regulator 16 is connected to an outlet of an AC power source (not shown) through an AC voltage input terminal (plug) TAC. The chopper switching regulator 16 commutates and smoothes a commercial AC voltage, and thus converts it into a DC voltage. Application and non-application of the DC voltage are switched using a switching means, whereby a pulsating voltage is produced and applied to a transformer 17. The duty factor of the pulsating voltage is varied by a load current. A main power source 18, a heater power source 19, and a CPU power source 14 are connected to the transformer 17.

In the main power source 18, a transformer receives a pulsating voltage from the transformer 17. A pulsating voltage of a different level is then produced. Thus-produced pulsating voltages are commutated and smoothed in order to produce DC voltages of 5 V, 12 V, 80 V, and 200 V. The voltage of 5V is applied to the horizontal driving signal generation circuit 8. The voltages of 80 V and 200 V are applied to the drive circuit 2. The voltage of 200 V is applied to the horizontal/vertical deflection circuit 9 and high-voltage circuit 10. The voltage of 12 V is applied to another circuit that is not shown. In the heater power source device 19, a step-down transformer receives the pulsating voltage from the transformer 17. The low pulsating voltage is commutated and smoothed in order to produce a voltage of 6.3 V. The voltage of 6.3 V is applied to a heater HT of the cathode-ray tube 3

A manual switch of the main power source 18 will be described below. The manual switch is connected in series with a power terminal of the main power source 18, at which a DC voltage of, for example, 12 V is developed, and a circuit, to which the DC voltage of 12 V is applied, and inserted between the power terminal and circuit. When the manual switch is turned off, a load current flowing into the chopper switching regulator 16 decreases greatly. This causes the duty factor of the pulsating voltage sent from the regulator 16 to become 0. Consequently, no voltage pulse is produced by the transformer 17. When the manual switch is turned on, the load current flowing into the chopper switching regulator 16 assumes a normal value. The duty factor of the pulsating voltage applied from the regulator 16 assumes a normal value. Consequently, the transformer 17 produces a voltage pulse.

In the CPU power source 14, a step-down transformer receives a pulsating voltage from the transformer 17. The low pulsating voltage is commutated and smoothed, whereby a voltage of 5 V is produced. The voltage of 5 V is applied to the CPU 5.

The CPU 5 controls an on-to-off transition to be made by the main power source 18 and heater power source 19 according to if the horizontal and vertical sync signals have been received through the input terminals TH and TV respectively. Moreover, the CPU 5 controls an amplification factor to be exhibited by the drive circuit 2. When both the horizontal and vertical sync signals H and V have been sent to the CPU 5, the CPU 5 turns on the main power source 18 and heater power source 19 (on mode). At this time, an image is displayed on the surface of the cathode-ray tube 3. In the power saving modes described below, no image is displayed on the surface of the cathode-ray tube 3. When the horizontal sync signal H has not been sent to the CPU 5 but the vertical sync signal V has been sent thereto, the CPU 5 turns on the main power source 18 and heater power source 19. Moreover, the CPU 5 minimizes the amplification factor to be exhibited by the drive circuit 2 (first-step power saving: standby mode). When the vertical sync signal V has not been sent to the CPU 5 but only the horizontal sync signal H has been sent thereto, the CPU 5 turns off the main power source 18 and turns on the heater power source device 19 only (second-step power saving: suspension mode). When the horizontal and vertical sync signals H and V have not been sent to the CPU 5, the CPU 5 turns off the main power source 18 and heater power source device 19 (third-step power saving: off mode). When the regulator 16 is disconnected from the mains AC power source device, the main power source 18, heater power source device 19, and CPU power source device 14 are naturally turned off.

In such a conventional image display device, when the horizontal and vertical sync signals have not been sent to the CPU, the CPU turns off the main power source device and heater power source device. However, in this state, power consumption is not reduced very efficiently.

When both the horizontal and vertical sync signals are not sent to the CPU, the CPU turns off the main power source device and heater power source device. At this time, if the CPU also turns off the CPU power source device, the effect of power saving is exerted fully. In this case, a sync signal sensor for sensing whether or not the horizontal and vertical sync signals are present is included independently of the CPU. When the horizontal or vertical sync signal is sensed, the CPU power source device that has been turned off must be turned on again. In this case, power is fed from a sync signal sensor power source device to the sync signal sensor.

In the case of the latter image display device, power supplied from the mains AC power source device is not fed to the power source device unit. The CPU power source device is therefore turned off. Thereafter, when the power supplied from the mains AC power source device is fed to the power source device unit, the manual switch of the main power source device is turned on irrespective of whether the horizontal and vertical sync signals are sent to the computer system. Thus, the main power source device is turned on. A voltage developed at the main power source device is applied to the sync signal sensor. Thus the CPU power source device must be turned on.

SUMMARY OF THE INVENTION

Accordingly, in view of the above-mentioned circumstance, the first aspect of the present invention provides an image display device including a cathode-ray tube, a sync signal sensor, a main power source, a heater power source, a sync signal sensor power source, and a power source unit. A video signal is sent to the cathode-ray tube. The sync signal sensor senses whether or not the horizontal and vertical sync signals are present. The main power source feeds power to circuits. The heater power source feeds power to a heater of the cathode-ray tube. The sync signal sensor power source feeds power to the sync signal sensor. Based on power supplied from a mains AC power source, the power source unit feeds power to the main power source, heater power source, and sync signal sensor power source. Even when the sync signal sensor fails to sense the horizontal and vertical sync signals, power consumption can be reduced with improved effectiveness.

The second aspect of the present invention provides an image display device including a signal processing circuit, a cathode-ray tube, a sync signal sensor, a main power source device, a heater power source device, a sync signal sensor power source device, and a power source device unit. A video signal and horizontal and vertical sync signals are sent from a video signal source to the signal processing circuit that processes the video signal. The video signal is transferred from the signal processing circuit to the cathode-ray tube. The sync signal sensor senses if the horizontal and vertical sync signals are present. The main power source device feeds power to circuits. The heater power source device feeds power to a heater-of the cathode-ray tube. The sync signal sensor power source device feeds power to the sync signal sensor. Based on power supplied from a mains AC power source device, the power source device unit feeds power to the main power source device, heater power source device, and sync signal sensor power source device. A consumed current can be reduced stepwise according to if the sync signal sensor fails to sense either or both of the horizontal and vertical sync signals. When the sync signal sensor fails to sense both the horizontal and vertical sync signals, power consumption can be reduced with improved effectiveness.

The third aspect of the present invention provides an image display device including a signal processing circuit, a cathode-ray tube, a sync signal sensor, a main power source device, a heater power source device, a sync signal sensor power source device, and a power source device unit. A video signal and horizontal and vertical sync signals are sent from a video signal source to the signal processing circuit that processes the video signal. The video signal is transferred from the signal processing circuit to the cathode-ray tube. The sync signal sensor sense whether or not horizontal and vertical sync signals are present. The main power source device feeds power to circuits. The heater power source device feeds power to a heater of the cathode-ray tube. The sync signal sensor power source device feeds power to the sync signal sensor. Based on power supplied from a mains AC power source device, the power source device unit feeds power to the main power source device, heater power source device, and sync signal sensor power source device. Herein, a consumed current can be reduced stepwise according to if the sync signal sensor fails to sense either or both of the horizontal and vertical sync signals. Even when the sync signal sensor fails to sense both the horizontal and vertical sync signals, power consumption can be reduced with improved effectiveness. After supply of power from the mains AC power source device to the power source device unit is discontinued, when supply of power is restarted, the sync signal sensor power source device can be turned on without the necessity of turning on a manual switch of the main power source device. Moreover, when the sync signal sensor succeeds in sensing both the horizontal and vertical sync signals, an image can be displayed on the surface of the cathode-ray tube. When the sync signal sensor fails to sense either or both the horizontal and vertical sync signals, a user is informed of the fact that although the image display device is in operation, no signal is sent from the video signal source. The sync signal sensor controls the main power source device, heater power source device, and signal processing circuit according to whether the sync signal sensor fails to sense either or both of the horizontal and vertical sync signals. Thus, power is saved.

According to the first aspect of the present invention, an image display device includes a cathode-ray tube, first and second sync signal sensors, a main power source device, a heater power source device, first and second sync signal sensor power supplies, and a power source device unit. A video signal is sent to the cathode-ray tube. The first and second sync signal sensors sense whether or not horizontal and vertical sync signals relative to the video signal are present. The main power source device feeds power to circuits. The heater power source device feeds power to a heater of the cathode-ray tube. The first and second sync signal sensor power supplies feed power to the first and second sync signal sensors respectively. Based on power supplied from a mains AC power source device, the power source device unit feeds power to the main power source device, heater power source device, and first and second sync signal sensor power supplies. When the first sync signal sensor fails to sense both the horizontal and vertical sync signals, the main power source device, heater power source device, and first sync signal sensor power source device are turned off. Power is thus saved. When the second sync signal sensor succeeds in sensing at least one of the horizontal and vertical sync signals, the first sync signal sensor power source device that has been turned off is turned on.

According to the first aspect of the present invention, the video signal is sent to the cathode-ray tube. The first and second sync signal sensors sense if the horizontal and vertical sync signals relevant to the video signal are present. The main power source device feeds power to the circuits. The heater power source device feeds power to the heater of the cathode-ray tube. The first and second sync signal sensor power sources feed power to the first and second sync signal sensors respectively. Based on power supplied from the mains AC power source device, the power source device unit feeds power to the main power source device, heater power source device, and first and second sync signal sensor power sources. When the first sync signal sensor fails to sense both the horizontal and vertical sync signals, the main power source device, heater power source device, and first sync signal sensor power source device are turned off. Power is thus saved. When the second sync signal sensor succeeds in sensing at least one of the horizontal and vertical sync signals, the first sync signal sensor power source device that has been turned off is turned on.

BRIEF DESCRIPTION OF THE DRAWINGS

FIG. 2A and FIG. 2B are explanatory diagrams explaining how to save power to be consumed by a cathode-ray tube included in the image display device in accordance with the exemplary embodiment, FIG. 2A is a table indicating the relationship between the presence or absence of horizontal and vertical sync signals and power saving modes in which power to be consumed by the cathode-ray tube,is saved, FIG. 2B shows a transition among states corresponding to the power saving modes, in which power to be consumed by the cathode-ray tube is saved, and to be made according to the presence or absence of the horizontal and vertical sync signals;

DESCRIPTION OF THE PREFERRED EMBODIMENTS

Exemplary Embodiment

Figure 1:
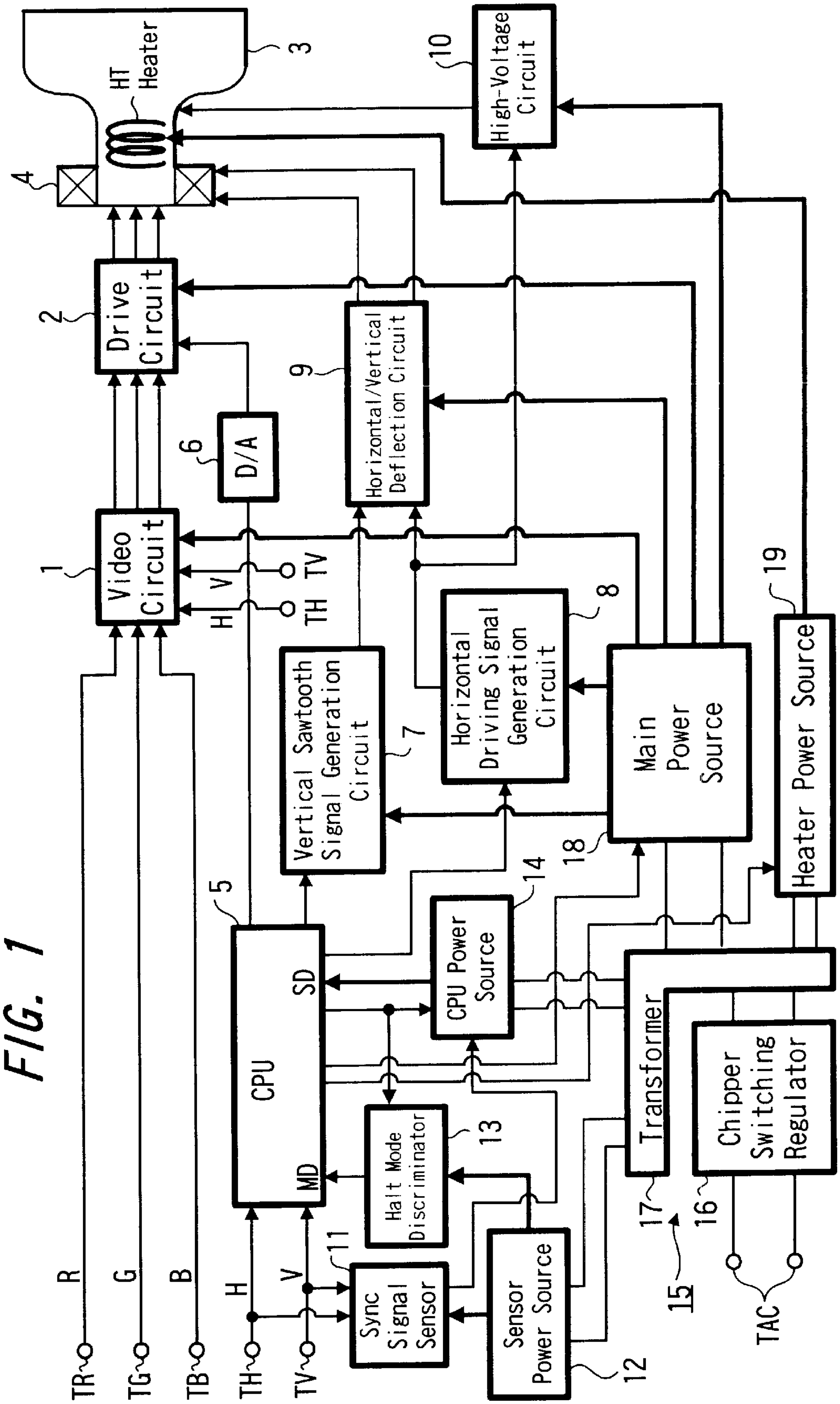
FIG. 1 is a block diagram showing an image display device in accordance with an exemplary embodiment of the present invention.
Figure 7:
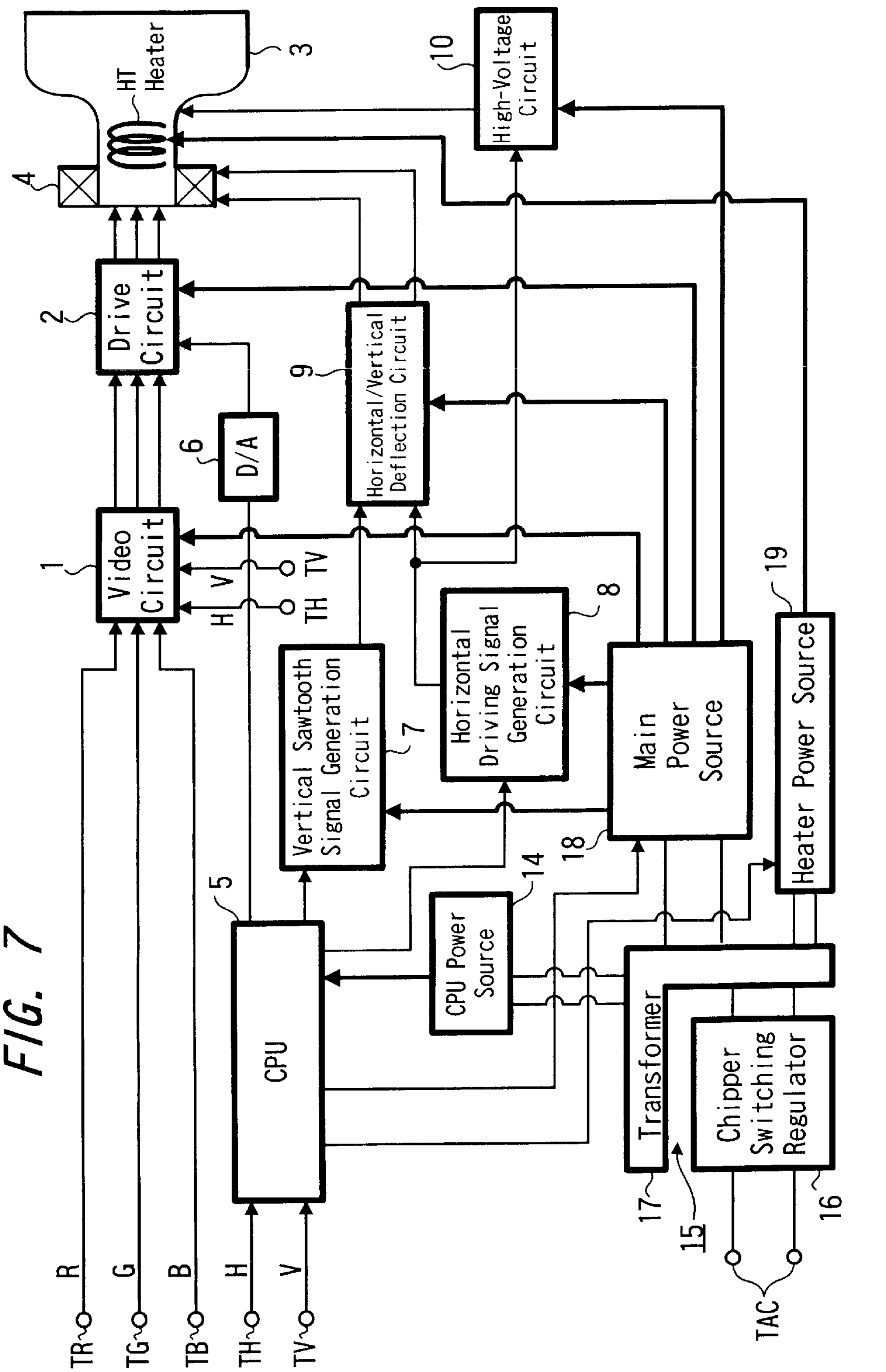
FIG. 7 is a block diagram showing an image display device in accordance with a prior art.

Referring to FIG. 1, an image display device in accordance with an exemplary embodiment of the present invention will be described below. In FIG. 1, the same reference numerals are assigned to components identical to those shown in FIG. 7. TR, TG, TB, TH, and TV denotes input terminals through which a red signal R, a green signal G, a blue signal B, a horizontal sync signal H, and a vertical sync signal V are sent from a computer system serving as a video signal source. As the video signal source, a TV tuner, a magnetic tape video signal recording/reproducing apparatus, and an optical disk (or magnetic disk) video signal reproducing apparatus (or recording/reproducing apparatus) will do.

The red, green, and blue signals R, G, and B received through the input terminals TR, TG, and TB and the horizontal and vertical sync signals H and V received through the input terminals TH and TV are transferred to a video circuit 1. The video circuit 1 processes the red, green, and blue signals R, G, and B. The red, green, and blue signals R, G, and B sent from the video circuit 1 are transferred to a cathode-ray tube drive circuit 2, and then amplified. Thereafter, the signals are transferred to cathodes of an electron gun, which are associated with the color signals, in the cathode-ray tube 3. The video circuit 1 and drive circuit 2 are generically called a signal processing circuit.

A digital amplification factor control signal sent from a CPU 5 that will be described later is transferred to a D/A converter 6, and converted into an analog amplification factor control signal. The analog amplification factor control signal is transferred to the drive circuit 2. An amplification factor is then controlled.

The central processing unit (CPU) 5 serving as a first sync signal sensor senses whether or not the horizontal and vertical sync signals H and V received through the input terminals TH and TV are present. Moreover, the CPU 5 produces horizontal data and vertical data, and feeds the data to a horizontal drive signal generation circuit 8 and a vertical sawtooth signal generation circuit 7 respectively. The horizontal drive signal generation circuit 8 and vertical sawtooth signal generation circuit 7 generate a horizontal driving signal (horizontal pulsating signal) and a vertical sawtooth signal respectively. The horizontal driving signal (horizontal pulsating signal) and vertical sawtooth signal are transferred to a horizontal/vertical deflection circuit 9. Horizontal and vertical deflection signals sent from the horizontal/vertical deflection circuit 9 are transferred to a horizontal/vertical deflection yoke 4 in the cathode-ray tube 3. Moreover, the horizontal driving signal sent from the horizontal driving signal generation circuit 8 is transferred to a high-voltage (high-voltage generation) circuit 10. A resultant high voltage is applied to an anode of the cathode-ray tube 3.

Reference numeral 11 denotes a sync signal sensor (second sync signal sensor) that senses whether or not the horizontal and vertical sync signals H and V received through the input terminals TH and TV are present.

Reference numeral 13 denotes a CPU halt mode discriminator. The CPU halt mode discriminator 13 judges whether a CPU power source device 14 is turned off by the CPU 5 or turned off because an AC voltage developed at the mains AC power source device is not applied to a power source device unit 15 that will be described later. The CPU halt mode discriminator 13 then stores the judgment in a memory.

Reference numeral 15 denotes a power source device unit composed of a chopper switching regulator 16 and a transformer 17. The chopper switching regulator 16 is connected to an outlet of an AC power source device (not shown) through an AC voltage input terminal (plug) TAC. The chopper switching regulator 16 commutates and smoothes a mains AC voltage, and thus converts it into a DC voltage. Application of the DC voltage and non-application thereof are switched using a switching means. This results in a pulsating voltage that is applied to the transformer 17. The duty factor of the pulsating voltage is varied depending on a load current. A main power source 18, a heater power source device 19, a CPU power source device 14, and a sync signal sensor power source device 12 are connected to the transformer 17.

In the main power source 18, a transformer receives the pulsating voltage from the transformer 17. A pulsating voltage of a different voltage level is then produced. Thus-produced pulsating voltages are commutated and smoothed, whereby DC voltages of 5 V, 12 V, 80 V, and 200 V are produced. The voltage of 5 V is applied to the horizontal driving signal generation circuit 8. The voltage of 80 V or 200 V is applied to the drive circuit 2. The voltage of 200 V is applied to the horizontal/vertical deflection circuit 9 and high-voltage circuit 10. The voltage of 12 V is applied to another circuit that is not shown. In the heater power source device 19, a step-down transformer receives the pulsating voltage from the transformer 17. The low pulsating voltage is commutated and smoothed, whereby a voltage of 6.3 V is produced. The voltage of 6.3 V is applied to a heater HT of the cathode-ray tube 3.

A manual switch of the main power source 18 will be described below. The manual switch is inserted in series between a power terminal, through which a DC voltage of, for example, 12 V is obtained, and a circuit, to which the DC voltage of 12 V is applied. When the manual switch is turned off, a load current flowing into the chopper switching regulator 16 decreases greatly. This causes the duty factor of the pulsating voltage applied from the regulator 16 to become 0. Consequently, no voltage pulse is transferred from the transformer 17. When the manual switch is turned on, the load current flowing into the chopper switching regulator 16 assumes a normal value. Consequently, the duty factor of the pulsating voltage transferred from the regulator 16 assumes a normal value. Eventually, the transformer 17 produces a voltage pulse.

In the CPU power source device 14, a step-down transformer receives the pulsating voltage from the transformer 17. The low pulsating voltage is commutated and smoothed, whereby a voltage of 5 V is produced. The voltage of 5 V is applied to the CPU 5. The CPU power source device 14 is turned off with a self-down signal SD sent from the CPU 5. When the sync signal sensor 11 succeeds in sensing at least one of the horizontal and vertical sync signals, the sync signal sensor 11 turns on the CPU power source device 14 that has been turned off. The self-down signal SD sent from the CPU 5 is also transferred to the CPU halt mode discriminator 13.

In the sync signal sensor power source device 12, a step-down transformer receives the pulsating voltage from the transformer 17. The sync signal sensor power source device 12 then generates a DC voltage of 5 V, and applies a voltage of, for example, 5 V to the sync signal sensor 11 and CPU halt mode discriminator 13.

When the regulator 16 is disconnected from the mains AC power source device, the main power source 18, heater power source device 19, CPU power source device 14, and sync signal sensor power source device 12 are naturally turned off.

Figures 3, 4:
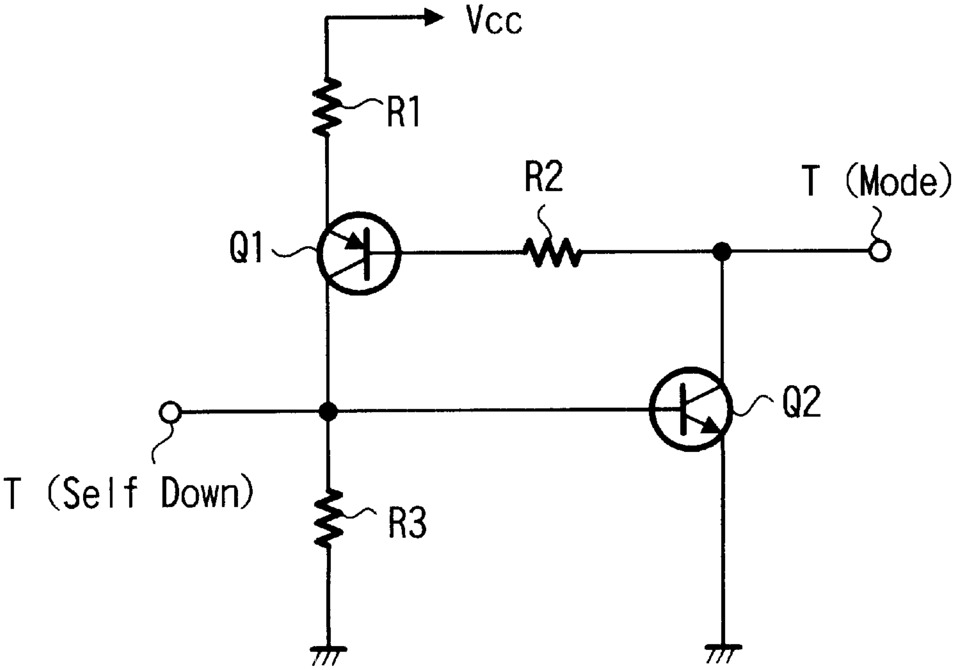
FIG. 3 is a circuit diagram showing the exemplary circuitry of a CPU halt mode discriminator included in the image display device in accordance with the exemplary embodiment.
FIG. 4 shows an example of a display screen of the cathode-ray tube included in the image display device in accordance with the exemplary embodiment.

FIG. 3 shows an example of the circuitry of the CPU halt mode discriminator 13. This example is realized with a one-bit memory. The emitter of a PNP transistor Q1 is connected to the sync signal sensor power source device 12 (voltage Vcc) via a resistor R1. The collector of the transistor Q1 is grounded via a resistor R3, and connected to an input terminal T (SLF DOWN) through which a self-down signal SD sent from the CPU 5 is transferred. The base of the transistor Q1 is connected to an output terminal T (MODE) through which a mode signal MD is output. The collector of a NPN transistor Q2 is connected to the output terminal T (MODE), the emitter thereof is grounded, and the base thereof is connected to the collector of the transistor Q1 .

After the CPU power source device 14 is turned off by the CPU 5, when the CPU 5 is activated, an output voltage developed at the output terminal T (MODE) in the CPU halt mode discriminator 13 is driven low. After the CPU power source device 14 is turned off because an AC voltage developed at the mains AC power source device is not applied to the power source device unit 15, when the CPU 5 is activated, the output voltage developed at the output terminal T (MODE) is driven high.

When the CPU 5 turns off the CPU power source device 14, the CPU 5 produces a self-down signal SD. The self-down signal is sent to the CPU power source device 14 and to the CPU halt mode discriminator 13. The CPU halt mode discriminator 13 judges whether the CPU power source device 14 is turned off by the CPU 5 or turned off because an AC voltage developed at the mains AC power source device is not applied to the power source device unit 15. The CPU halt mode discriminator 13 then stores the judgment in a memory. A halt mode signal MD produced by the CPU halt mode discriminator 13 is sent to the CPU 5.

Referring to FIG. 2, a description will be made of how the CPU 5 controls an on-to-off transition to be made by the main power source 18, heater power source device 19, and CPU power source device 14 according to whether or not the horizontal and vertical sync signals received through the input terminals TH and TV are present. Control of an amplification factor to be exhibited by the drive circuit 2 will also be described. To begin with, a description will be made with reference to FIG. 2A. When the CPU 5 succeeds in sensing both the horizontal and vertical sync signals H and V, it turns on the main power source 18 and heater power source device 19 (on mode). At this time, the cathode-ray tube 3 is turned on and an image is displayed on the surface. In the power saving modes to be described later, no image is displayed on the surface of the cathode-ray tube 3. When the CPU 5 fails to sense the horizontal sync signal H and succeeds in sensing the vertical sync signal V, it turns on the main power source 18 and heater power source device 19. The CPU 5 minimizes the amplification factor to be exhibited by the drive circuit 2. At this time, the cathode-ray tube 3 is on standby. When the CPU 5 fails to sense the vertical sync signal V and succeeds in sensing the horizontal sync signal H, it turns off the main power source 18 but turns on the heater power source device 19. At this time, the cathode-ray tube 3 is suspended.

When the CPU 5 fails to sense both the horizontal and vertical sync signals H and V, it turns off the main power source 18 and heater power source device 19. The CPU 5 produces a self-down signal SD, sends it to the CPU power source device 14, and thus turns off the CPU power source device 14. At this time, the cathode-ray tube 3 is turned off.

FIG. 2B shows a transition from a state of the image display device in which the cathode-ray tube 3 is on to a state in which power is saved to the greatest extent. When a transition is made from a state in which the AC power source device is off to a state in which the AC power source device is on, the main power source 18 is turned on without fail. The cathode-ray tube 3 is therefore turned on. When the cathode-ray tube 3 is on, if the CPU 5 fails to sense the horizontal sync signal H, the state is changed to a state in which the cathode-ray tube 3 is on standby. When the cathode-ray tube 3 is on standby, if the CPU 5 succeeds in sensing the horizontal sync signal H but fails to sense the vertical sync signal V, the state is changed to a state in which the cathode-ray tube 3 is suspended. When the cathode-ray tube 3 is suspended, if the CPU 5 fails to sense the horizontal sync signal H, the state is changed to a state in which the cathode-ray tube 3 is off.

Referring to FIG. 2B, when the cathode-ray tube 3 is off, if the main power source 18 remains off, the CPU 5 may succeed in sensing the horizontal sync signal H. In this case, the state is changed to the state in which the cathode-ray tube 3 is suspended. When the cathode-ray tube 3 is suspended, if the CPU 5 succeeds in sensing the vertical sync signal V but fails to sense the horizontal sync signal H, the state is changed to the state in which the cathode-ray tube 3 is on standby. When the cathode-ray tube 3 is on standby, if the CPU 5 succeeds in sensing the horizontal sync signal H, the state is changed to the state in which the cathode-ray tube 3 is on.

When the cathode-ray tube 3 is on, if the CPU 5 fails to sense both of the horizontal and vertical sync signals H and V, the state is changed to the state in which the cathode-ray tube 3 is off. When the cathode-ray tube 3 is off, if the CPU 5 succeeds in sensing both of the horizontal and vertical sync signals H and v, the state is changed to the state in which the cathode-ray tube 3 is on.

When the cathode-ray tube 3 is on, if the CPU 5 fails to sense the vertical sync signal V, the state is changed to the state in which the cathode-ray tube 3 is suspended. When the cathode-ray tube 3 is suspended, if the CPU 5 succeeds in sensing the vertical sync signal V, the state is changed to the state in which the cathode-ray tube 3 is on When the cathode-ray tube 3 is on standby, if the CPU 5 fails to sense the vertical sync signal V, the state is changed to the state in which the cathode-ray tube 3 is off. When the cathode-ray tube 3 is off, if the CPU 5 succeeds in sensing the vertical sync signal V, the state is changed to the state in which the cathode-ray tube 3 is on standby.

Figures 5A, 5B, 5C, 5D:
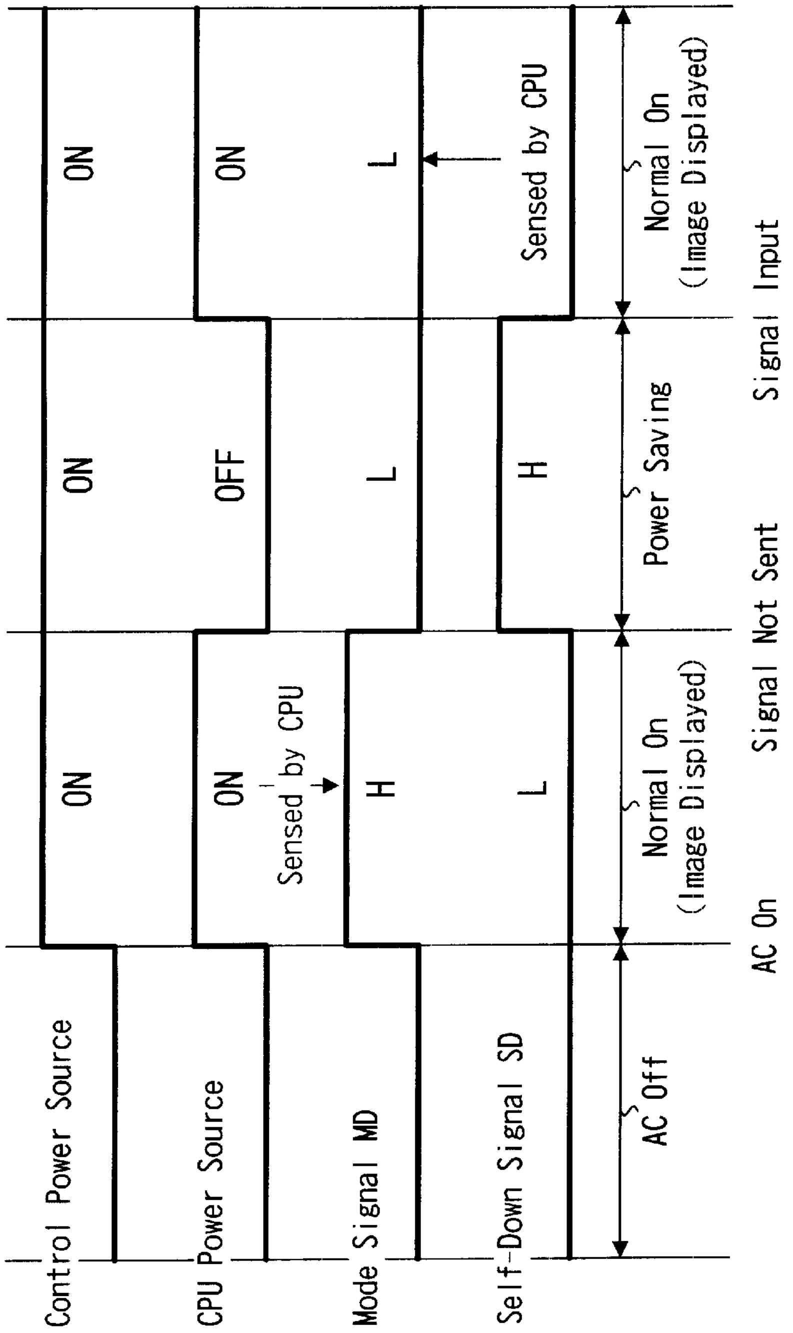
FIG. 5 is a timing chart indicating the action of the CPU halt mode discriminator included in the image display device in accordance with the exemplary embodiment and the timing according to which CPU senses a mode signal MD.

Referring to FIG. 5A to FIG. 5D, a description will be made of the action of the CPU halt mode discriminator 13 and the timing according to which the CPU 5 senses a mode signal MD. FIG. 5A shows an on-to-off transition made by the sync signal sensor power source device 12. FIG. 5B shows an on-to-off transition made by the CPU power source device 14. FIG. 5C shows a high-to-low transition made by a mode signal MD. FIG. SD shows a high-to-low transition made by a self-down signal SD.

When the power source device unit 15 is not connected to the mains AC power source device (ac power source device is off), the sync signal sensor power source device 12 and CPU power source device 14 are off. The mode signal MD is low, and the self-down signal SD is low.

After the AC power source device is turned off, it is then turned on, and when the cathode-ray tube 3 is turned on, an image is displayed on the surface of the cathode-ray tube 3. At this time, the sync signal sensor power source device 12 and CPU power source device 14 are on, and the mode signal MD is high. The CPU 5 senses the mode signal MD. The CPU 5 drives the self-down signal SD to a low level.

When power is saved, the CPU 5 fails to sense the horizontal and vertical sync signal H and V. At this time, the sync signal sensor power source device 12 is on. The CPU 5 drives the self-down signal to a high level immediately before power saving is started. The CPU power source device 14 is thus turned off. At this time, the halt mode discriminator 13 acts to latch the mode signal MD to a low level.

After power saving is terminated, when the cathode-ray tube 3 is turned on, an image is displayed on the surface of the cathode-ray tube. At this time, the sync signal sensor power source device 12 and CPU power source device 14 are on, and the mode signal MD is low. The CPU 5 senses the mode signal MD. The CPU 5 then drives the self-down signal SD to a low level.

Figure 6:
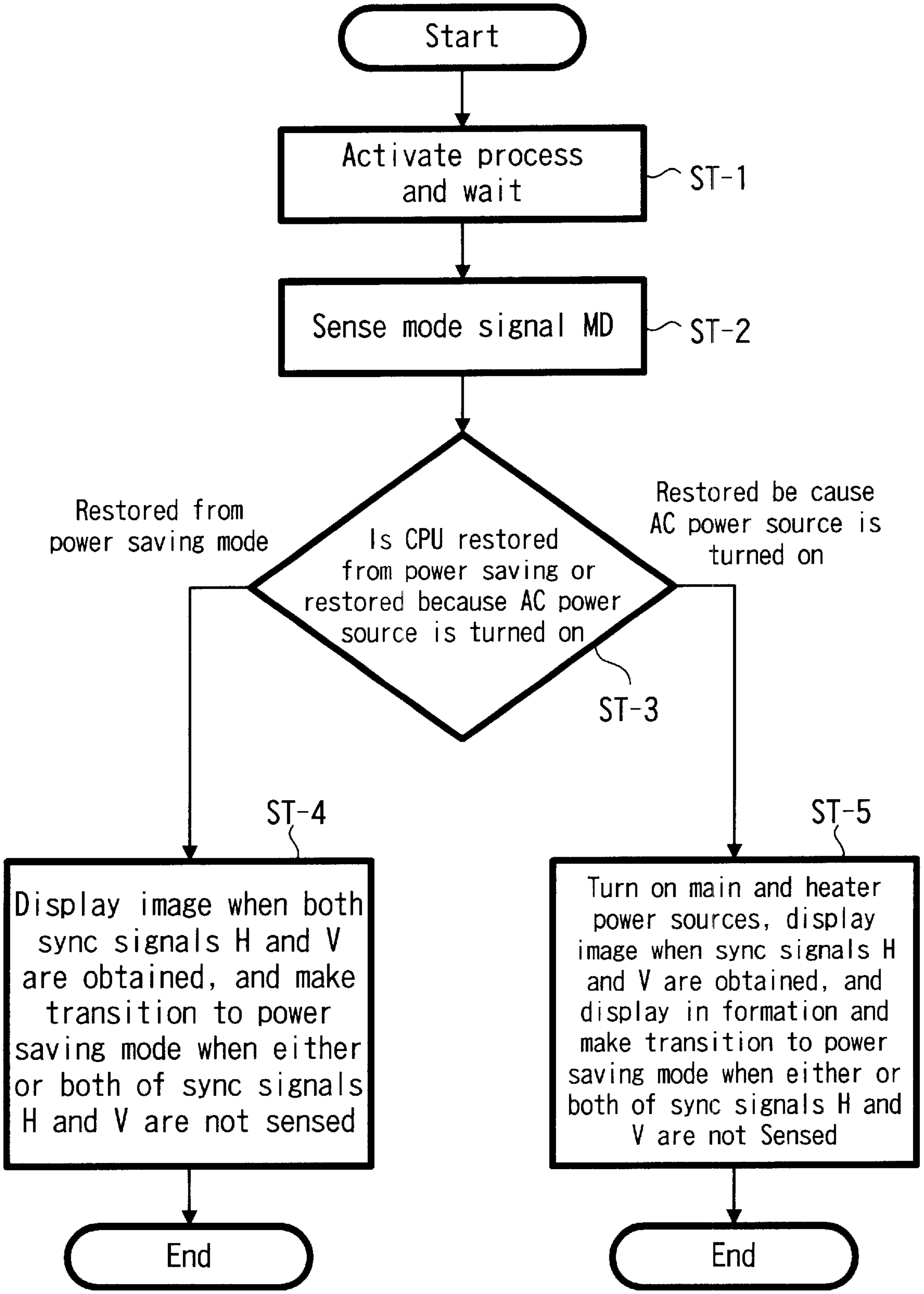
FIG. 6 is a flowchart describing the action of the CPU included in the image display device in accordance with the exemplary embodiment to be made immediately after the CPU is activated.

Referring to the flowchart of FIG. 6, a description will be made of the action of the CPU 5 to be performed according to a program installed in the CPU 5 immediately after the CPU is activated. At step ST-1, the CPU 5 performs activation and enters a wait state. Control is passed from step ST-1 to step ST-2. The CPU 5 senses the mode signal MD. Control is then passed to step ST-3. It is judged whether the CPU 5 is activated in order to restore the image display device from a power saved state or to restore the image display device because the AC power source device is turned on.

If it is judged at step ST-3 that the image display device is restored from the power saved state, control is passed to step ST-4. When the CPU 5 succeeds in obtaining (sensing) both the horizontal and vertical sync signals H and V, an image is displayed on the cathode-ray tube 3. When either or neither of the horizontal and vertical sync signals H and V is obtained (sensed), the present mode is changed to a power saving mode for saving power to be consumed by the cathode-ray tube 3. The program is then terminated.

If it is judged at step ST-3 that the image display device is restored because the AC power source device is turned on, control is passed to step ST-5. When the CPU 5 succeeds in obtaining (sensing) the horizontal and vertical sync signals H and V, an image is displayed on the cathode-ray tube 3. When the CPU 5 succeeds in obtaining (sensing) either of the horizontal and vertical sync signals H and V or fails to obtain (sense) both the horizontal and vertical sync signals, a message appears to indicate that the image display device is in operation but no signal is sent from the computer system (video signal source). Thereafter, the image display device is brought to a power saving mode for saving power to be consumed by the cathode-ray tube 3. The program in then terminated.

FIG. 4 shows an example of a display screen appearing on the surface of the cathode-ray tube 3 and displaying a message saying that the image display device is in operation but no signal is sent from the video signal source. The first row of the message shows information. The second row thereof indicates that the image display device is in operation. The third row thereof indicates that the computer system and image display device are connected using BNC connectors (including a cord). The fourth row thereof indicates that no signal (red, green, and blue signals, and horizontal and vertical sync signals) is sent from the computer system to the image display device.

Four belts in the lower part of the display screen are painted in colors associated with the characters of white, red, green, and blue. The four belts demonstrate whether the colors of white, red, green, and blue appear correctly.

According to the first aspect of the present invention, it is possible to obtain an image display device capable of improving the effect to reduce power consumption when the sync signal sensor fails to sense both the horizontal and vertical sync signals.

According to the second aspect of the present invention, it is possible to obtain an image display device capable of reducing power consumption step-wise according to whether the sync sensor fails to sense either or both of the horizontal and vertical sync signals as well as of improving the effect to reduce power consumption when the sync sensor fails to sense both the horizontal and vertical sync signals.

According to the third aspect of the present invention, it is possible to obtain an image display device which is capable of reducing a consumed current stepwise according to whether the sync signal sensor fails to sense either or both of the horizontal and vertical sync signals, improving the effect to reduce power consumption even when the sync signal sensor fails to sense both of the horizontal and vertical sync signals, turning on the sync signal sensor power source device without the necessity of turning on a manual switch of the main power source device when supply of power is restarted after supply of power from the mains AC power source device to the power source device unit is discontinued, displaying an image on the surface of the cathode-ray tube when the sync signal sensor senses both the horizontal and vertical sync signals, informing a user of the fact that the image display device is in operation but no signal is sent from the video signal source when the sync signal sensor fails to sense either or both of the horizontal and vertical sync signals, with the sync signal sensor controlling the main power source device, heater power source device, and signal processing circuit depending on whether the sync signal sensor fails to sense either or both of the horizontal and vertical sync signals to save power.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. An image display device, comprising:

a cathode-ray tube for receiving a video signal;

first and second sync signal sensors for sensing whether horizontal and vertical sync signals relative to the video signal are present;

a main power source for feeding power to circuits for driving said cathode ray tube;

a heater power source for feeding power to a heater of said cathode-ray tube;

first and second sync signal sensor power sources for feeding power to said first and second sync signal sensors respectively; and a power source unit for feeding power to said main power source, to said heater power source device, and to said first and second sync signal sensors according to power supplied from a mains AC power source device, wherein when said first sync signal sensor fails to sense both the horizontal and vertical sync signals, said main power source device, said heater power source device, and said first sync signal sensor power source device are turned off to save power and when said second sync signal sensor senses at least one of the horizontal and vertical sync signals, said first sync signal sensor power source device that was turned off is turned on.

2. An image display device, comprising:

a signal processing circuit for receiving a video signal and horizontal and vertical sync signals from a video signal source and for processing the video signal;

a cathode-ray tube for receiving the video signal from said signal processing circuit;

a first sync signal sensor for sensing whether the horizontal and vertical sync signals are present;

a main power source device for feeding power to circuits for driving said cathode ray tube;

a heater power source device for feeding power to a heater of said cathode-ray tube;

a first sync signal sensor power source device for feeding power to said first sync signal sensor;

a power source device unit for feeding power to said main power source device, to said heater power source device, and to said first sync signal sensor power source device according to power supplied from a mains AC power source device, wherein when said first sync signal sensor senses both of the horizontal and vertical sync signals, said main power source device and heater power source device are turned on and an image is displayed on said cathode-ray tube when only one of the horizontal and vertical sync signals is sensed by said first sync signal sensor, in a first operation said main power source device and said heater power source device are turned on but no image is displayed on said cathode-ray tube and in a second operation said main power source device is turned off and said heater power source device is turned on and when neither of the horizontal and vertical sync signals are sensed, said main power source device and said heater power source device are turned off whereby said first sync signal sensor controls said main power source device, said heater power source device, and said signal processing circuit so as to save power, wherein when said first sync signal sensor fails to sense both of the horizontal and vertical sync signals, said first sync signal sensor controls said first sync signal sensor power source device so as to turn off said first sync signal sensor power source device;

a second sync signal sensor for sensing whether the horizontal and vertical sync signals are present; and a second sync signal sensor power source device to which power is fed from said power source device unit and which feeds power to said second sync signal sensor, characterized in that when said second sync signal sensor senses at least one of the horizontal and vertical sync signals, said second sync signal sensor turns on said first sync signal sensor power source device that was turned off.

3. The image display device according to claim 2, further comprising a first sync signal sensor halt mode discriminator to which power is fed from said second sync signal sensor power source device for judging whether said first sync signal sensor power source device is turned off by said first sync signal sensor or turned off because an AC voltage developed at said mains AC power source device is not applied to said power source device unit, and for storing a judgment in a memory, wherein when said first sync signal sensor power source device that was turned off is turned on and contents of the memory in said first sync signal sensor halt mode discriminator indicate that said first sync signal sensor power source device was turned off by said first sync signal sensor, said first sync signal sensor controls said main power source device, said heater power source device, and said signal processing circuit according to whether said first sync signal sensor senses the horizontal and vertical sync signals when the contents of the memory in said first sync signal sensor halt mode discriminator indicate that said first sync signal sensor power source device was turned off because an AC voltage developed at said mains AC power source device is not applied to said power source device unit and said first sync signal sensor senses both of the horizontal and vertical sync signals, both of said main power source device and said heater power source device are turned on and an image is displayed on said cathode-ray tube when said first sync signal sensor fails to sense either or both of the horizontal and vertical sync signals, both of said main power source device and said heater power source device are turned on and a message that said image display device is in operation but no signal is sent from said video signal source is displayed on said cathode-ray tube; and said first sync signal sensor controls said main power source device, said heater power source device, and said signal processing circuit according to whether said first sync signal sensor fails to sense either or both of the horizontal and vertical sync signals, so that no image will be displayed on said cathode-ray tube.

* * * * *